Oct. 6, 1964 P. F. KAESTNER 3,152,325
HYBRID OPTICAL ENCODER
Filed March 22, 1962
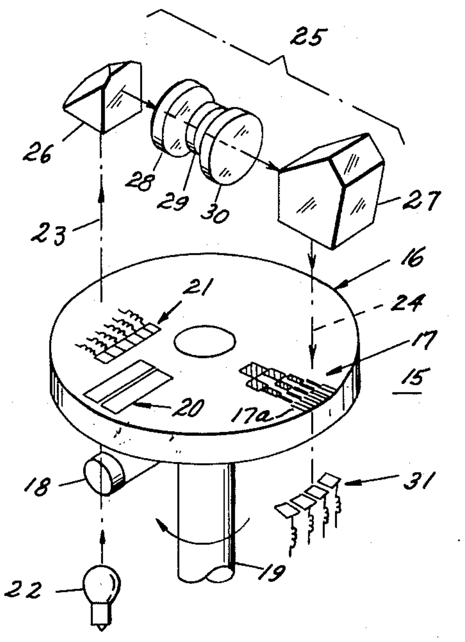
INVENTOR.
PAUL F. KAESTNER
BY
OSTROLENK, FABER, GERB & SOFFEN
ATTORNEYS United States Patent Office 3,152,325

Patented Oct. 6, 1964

3,152,325
HYBRID OPTICAL ENCODER

Paul F. Kaestner, Huntington, N.Y., assignor to Kollsman Instrument Corporation, Elmhurst, N.Y., a corporation of New York Filed Mar. 22, 1962, Ser. No. 181,573
4 Claims. (Cl. 340—347)

This invention relates to optical encoders, and more particularly relates to novel improvements providing greater accuracy and more channels for such encoders.

By increasing the available channels that can be practicably scanned on an encoder disc, one may either reduce its diameter for a given number of channels, or provide the larger number on a given dimension. The present invention provides two separated groups of electro-optical detectors for the encoder disc. The fine readout is performed at two locations, 180° separated across the disc. Suitable prism paths and photoelectric detectors are employed. The system hereof corresponds to that of my copending patent application Serial No. 155,709, filed November 29, 1961, for "High Resolution Digital Encoder," assigned to the same assignee.

These and further features, advantages and objects of this invention will become more apparent from the following description of an exemplary embodiment thereof, illustrated in the drawing, in which the sole figure is a perspective view of the exemplary optical encoder.

The encoder 15 is a hybrid optical type, with its operational range extended by the invention. The optical code disc 16 utilizes a cyclic binary or Gray code 17, well known in the art. To provide a coarse readout, the disk 16 is illuminated by a lamp 18. The code channels (17) are read through a slit 20. The light pulses produced are converted to electrical signals by photoelectric detectors 21. Such coarse readout means is conventional.

The present invention is directed to concurrently provide the fine readout and, at the same time, eliminate first order eccentricity errors in the optical disk. A second optical system is provided to image a section of the outermost code channel (*17a*) on a like section of the same channel at 180° displacement. The disc section to be imaged is illuminated by a lamp 22 with beam 23 projected by the use of an assembly of prisms and lenses 25 as beam 24 to produce an image which moves counter to the disc 16 as it is rotated. Optical assembly 25 comprises two spaced 90° prisms located above the outer channel region (*17a*) namely near the disc 16 periphery. Suitable stationary mounted lenses 28, 29, 30 placed between prisms 26, 27 direct the original beam 23 into prism 26 into prism 27 as emergent beam 24.

By proper adjustment of the lenses 28, 29, 30, the image can be set to be slightly smaller or larger than the actual code on the disk 16. By this means a vernier effect is produced and the light pulses resulting at various locations will occur progressively. These light pulses are converted to electrical signals by photoelectric detectors 31 located beneath the disc 16 under its code peripheral region. Using the Gray code, and allowing for the doubling action of the disk 16 and its image, each of the photoelectric detectors 31 produces as many "on" and "off" electrical signals as there are "bits" of code on the disk 16. By the proper spacing of the photoelectric detectors 31, the electrical signals may be staggered to produce additional digital read-out channels.

It is to be noted that a translational movement of the disk 16 caused by eccentricity, does not affect the "on" or "off" status of the pulses of light actuating the photoelectric detectors 31. This is because, as a result of translation, the disk 16 and its image move together in the same direction. Thus the invention arrangement is effective in eliminating first order eccentricity errors. One of the signals produced by this method may be used to generate a zero reset pulse to eliminate the accumulation of a counting error. This same reset pulse can be used to establish the transfer of count for the coarse disk readout system using logic circuitry similar to that described in my copending patent application referred to hereinabove.

An important practical consideration in practicing the present invention is the establishment and maintainance of a fixed magnification of the disk 16 image. Not only must the optical elements (25) of the system be adjustable to a fine degree, but the disk wobble must be maintained at a low tolerance to avoid changes in magnification as the disk (16) is rotated. A better understanding is derived by the following numerical analysis of a typical application:

If we let $N$=the number of coarse channels, $M$=the number of fine or vernier channels, and assume that the vernier covers 10 degrees of the disc's periphery and can tolerate an error of the vernier action corresponding to ¼ of the least bit or increment, the following relationships can be derived:

$$\text{Image positional accuracy} = \frac{360}{2^{N+M}} \times \frac{1}{4} = \frac{90}{2^{N+M}}$$

$$\text{Allowable error over the } 10° \text{ field} = \frac{90}{2^{N+M}} \times \frac{1}{10} \times 100\%$$

$$E = \frac{900}{2^{N+M}}$$

Based on a 3-inch diameter disc 16, with a wobble of .001 inch total indicator reading, and using lenses (28, 29, 30) with 3-inch focal conjugates, the optical system (25) magnification changes by $$\frac{.001}{3.000} \times 100 = .033\%$$

If we let error E in the above equation equal this amount, we obtain $$2^{N+M} = \frac{900}{.033} = 27{,}000$$

The value of $N+M$ or total channels of binary output as derived from this expression thus permit the use of approximately 15 bits.

By examination of the equations, improvement is made by decreasing field angle, reducing disc wobble and increasing lens focal lengths. If the field angle is reduced, the space for the photoelectric detectors 31 may become too small. Reduction of the disc wobble by a factor of two may be feasible if careful manufacturing and encoder application techniques are employed. Some increase in focal length is reasonable but at the expense of an increase in the physical size of the unit 15.

Using a 13 channel code disc 16, a housing diameter of about 3 inches appears feasible. Three or four channels of additional data, starting with eccentricity corrected 13 bits, will provide an encoder of 15 or 16 bits. As conventional optical encoders of this capacity employ 9 inch diameter discs, the size reduction with retained readout accuracy of the invention encoder is considerable.

The principles of this invention are thus generally applicable for size reduction with channel capacity increase. An optical encoder capable of an output of 15 or 16 channels of digital output and contained in a reasonably small package is feasible, based on the invention system. As the physical design is scaled up in size, more output channels can be provided. Increasing the disc (16) size to 5 or 6 inches in diameter, would allow the use of 14 data channels; and scaling up the focal length, holding the same accuracy, and reducing the field angle in proportion to the increased focal length, results in a configuration with 18 channel readout capability.

Although the present invention has been described in connection with an exemplary form, modifications thereof are feasible within the broader spirit and scope of the invention as set forth in the appended claims.

The embodiments of the invention in which an exclusive privilege or property is claimed are defined as follows:

1. An optical encoder comprising a rotatable optical code disc provided with a plurality of code channels on its face, first electro-optical means for deriving coarse readout signals of said code channels, and second electro-optical means for deriving fine readout signals including spaced prisms for directing a beam of light already passed through said disc to the corresponding diametrically opposite disc region, a stationary lens array between said spaced prisms for producing an image of the coded bits, said image being unequal in size relative to the coded bits from which the image is formed, and photoelectric detectors responsive to said image for producing the fine readout signals.

2. An optical encoder comprising a rotatable optical code disc provided with a plurality of code channels on its face, first electro-optical means for deriving coarse readout signals of said code channels, and second electro-optical means for deriving fine readout signals from a radially outer code channel including a pair of spaced prisms for directing a beam of light already passed through said disc to the corresponding diametrically opposite disc region, a stationary lens array in the path of said directed light beam between said spaced prisms for producing an image of the coded bits of predetermined size, said image being unequal in size relative to the coded bits from which the image is formed, and photoelectric detectors responsive to said image for producing the fine readout signals.

3. An optical encoder comprising a rotatable optical code disc provided with a plurality of code channels on its face, first electro-optical means for deriving coarse readout signals of said code channels, and second electro-optical means for deriving fine readout signals from the outermost code channel including spaced 90° prisms for directing a beam of light already passed through said disc at its peripheral region to the corresponding diametrically opposite disc region, a stationary lens array in the path of the said directed light beam between said spaced prisms for producing an image of the coded bits of the scanned channel of predetermined size, said image being unequal in size relative to the coded bits from which the image is formed, and photoelectric detectors responsive to said image for producing the fine readout signals.

4. An optical encoder comprising a rotatable optical code disc provided with a plurality of code channels on its face, first electro-optical means for deriving coarse readout signals of said code channels, and second electro-optical means for deriving fine readout signals from a radially outer code channel including a pair of spaced 90° prisms for directing a beam of light already passed through said disc at its peripheral region to the corresponding diametrically opposite disc region, a stationary lens array in the path of the said directed light beam between said spaced prisms for producing an image of the coded bits of the scanned channel of predetermined size, said image being unequal in size relative to the coded bits from which the image is formed, said image moving counter to the disc rotational direction, and photoelectric detectors responsive to said image for producing the fine readout signals.

References Cited in the file of this patent

UNITED STATES PATENTS 3,046,541 Knox ------------------ July 24, 1962